(12) United States Patent
Jia et al.

(10) Patent No.: US 10,614,544 B2
(45) Date of Patent: Apr. 7, 2020

(54) SYSTEM AND METHOD FOR SPACE SITUATIONAL AWARENESS DEMONSTRATION

(71) Applicant: Intelligent Fusion Technology, Inc., Germantown, MD (US)

(72) Inventors: Bin Jia, Germantown, MD (US); Sixiao Wei, Germantown, MD (US); Zhijiang Chen, Germantown, MD (US); Genshe Chen, Germantown, MD (US); Khanh Pham, Kirtland AFB, NM (US); Erik Blasch, Arlington, VA (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 22 days.

(21) Appl. No.: 15/971,940

(22) Filed: May 4, 2018

(65) Prior Publication Data

US 2018/0268605 A1    Sep. 20, 2018

Related U.S. Application Data

(63) Continuation-in-part of application No. 14/927,428, filed on Oct. 29, 2015, now Pat. No. 9,990,766.

(51) Int. Cl.
*G06T 1/20* (2006.01)
*B64G 7/00* (2006.01)
*G08G 99/00* (2006.01)

(52) U.S. Cl.
CPC .............. *G06T 1/20* (2013.01); *B64G 7/00* (2013.01); *G08G 99/00* (2013.01); *G06T 2210/52* (2013.01)

(58) Field of Classification Search
CPC ..................................... B64G 3/00; B64G 7/00
See application file for complete search history.

(56) References Cited

U.S. PATENT DOCUMENTS 5,987,363 A    11/1999   Quan et al.
9,058,678 B1    6/2015   Le Grand
(Continued)

OTHER PUBLICATIONS

Shou, H. et al., "Orbit propagation and determination of low earth orbit satellites," International Journal of Antennas and Propagation, 2014, vol. 2014.
(Continued)

*Primary Examiner* — Phi Hoang
(74) *Attorney, Agent, or Firm* — Anova Law Group, PLLC

(57) ABSTRACT

Methods and systems for space situational awareness (SSA) demonstration are provided. The system includes a space data collector component, for collecting space initialization data of space objects from initialized space sources and pre-processing the space initialization data; a data relocation component, for distributing the space initialization data pushed from the space data collector component into multiple streaming channels for streaming; a streaming platform, for streaming, mapping, and reducing the space initialization data from the data relocation component to provide streamed data; a real-time analysis component, for calculating the streamed data to conduct a real-time detecting and tracking analysis of the space objects by implementing algorithms for one or more of space uncertainty propagation, space object tracking, sensor management, and collision avoidance; and a space visualization component, for displaying a visualization of space situational awareness (SSA) based on analyzed results from the real-time analysis component.

20 Claims, 12 Drawing Sheets

(56) References Cited

U.S. PATENT DOCUMENTS

| | | | |
|---|---|---|---|
| 2009/0289843 A1 | 11/2009 | Jayasinghe | |
| 2012/0150573 A1 | 6/2012 | Soubra | |
| 2013/0124079 A1* | 5/2013 | Olivier | B64G 3/00 |
| | | | 701/301 |
| 2014/0074768 A1* | 3/2014 | Horwood | B64G 3/00 |
| | | | 706/52 |
| 2016/0188176 A1* | 6/2016 | Runnels | G06T 11/206 |
| | | | 715/788 |
| 2019/0050136 A1* | 2/2019 | Alfano | G06F 3/04815 |
| 2019/0210746 A1* | 7/2019 | Feconda | G01S 1/042 |

OTHER PUBLICATIONS

Jia, B. et al., "Sparse Gauss-Hermite Quadrature Filter with an Application to Spacecraft Attitude Estimation," Journal of Guidance, Control, and Dynamics, vol. 34, No. 2, Mar.-Apr. 2011, pp. 367-379.

Jones, B. A., et al, "Nonlinear Propagation of Orbit Uncertainty Using Non-Intrusive Polynomial chaos," Journal of Guidance, Control, and dynamics, vol. 36, No. 2, pp. 415-425, 2013.

Jia, B. et al., "Stochastic collocation method for uncertainty propagation," AIAA Guidance, Navigation and Control Conference, Minneapolis, Minnesota, Aug. 13-16, 2012.

Nevels, M. et al., "Sparse grid-based orbit uncertainty propagation," AAS/AIAA Astrodynamics Specialist Conference, Girdwod, Alaska, Jul. 31-Aug. 4, 2011.

Park, R. et al., "Nonlinear mapping of Gaussian statistics: theory and applications to spacecraft trajectory designs," Journal of Guidance, Control, and Dynamics, vol. 29, No. 6, 2006, pp. 1367-1375.

Guo, D. et al., "Quasi-Monte Carlo Filtering in Nonlinear Dynamic Systems," IEEE Transactions on signal Processing, vol. 54, No. 6, Jun. 2006, pp. 2087-2098.

* cited by examiner

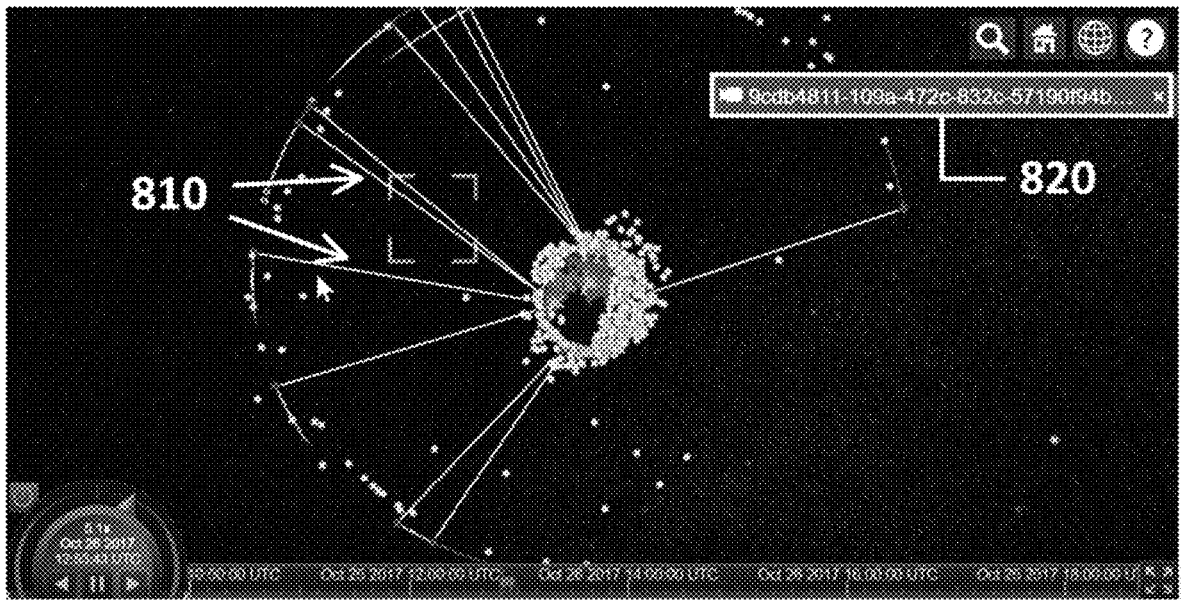

FIG. 8

```
{"satellite":[{"satelliteId":"GOES-15-1", "satelliteName":"GOES-15", "propagation_period":60,
"propagation_steps":520, "X":40966, "Y":6890.7, "Z":7290.3, "VX":-0.7197, "VY":2.4479, "VZ":1.7140,
"Time":"2017-10-26T10:00:00Z"}, {"satelliteId":"Americom-11-2", "satelliteName":"Americom-11", "propagation_period":60,
"propagation_steps":520, "X":39583.44826680594, "Y":-14667.44137349241, "Z":1034.606984689534,
"VX":1.858311326601952, "VY":2.881484705040352, "VZ":0.884238225311512, "Time":"2017-10-26T10:00:00Z"}, {"satelliteId":"ViaSat-1-3", "satelliteName":"ViaSat-1", "propagation_period":60,
"propagation_steps":520, "X":41701.26274988417, "Y":6047.574886254874, "Z":1300.593488227251, "VX":-
0.444457116500686, "VY":3.041766090631071, "VZ":0.034944612096519, "Time":"2017-10-26T10:00:00Z"}, {"satelliteId":"EchoStar-1-4", "satelliteName":"EchoStar-1", "propagation_period":60,
"propagation_steps":520, "X":42004.16384151366, "Y":2544.859798861290, "Z":2676.123926985317, "VX":-
0.193049692641983, "VY":3.065520008182168, "VZ":0.104767587539117, "Time":"2017-10-26T10:00:00Z"}, {"satelliteId":"Galaxy-27-5", "satelliteName":"Galaxy-27", "propagation_period":60,
"propagation_steps":520, "X":-12806.80497783967, "Y":-40008.43782673658, "Z":-3441.574199482486,
"VX":2.918232747367916, "VY":-0.954516767330501, "VZ":0.192355954136519, "Time":"2017-10-
26T10:00:00Z"}, {"satelliteId":"DirectTv-7S-6", "satelliteName":"DirectTv-7S", "propagation_period":60,
"propagation_steps":520, "X":13309.34527734437, "Y":-39979.41787866334, "Z":-1183.788840463187,
"VX":2.912893510069777, "VY":0.954906788423080, "VZ":0.250779959734917, "Time":"2017-10-26T10:00:00Z"}, {"satelliteId":"Horizons-1-7", "satelliteName":"Horizons-1", "propagation_period":60,
"propagation_steps":520, "X":-18288.33319734341, "Y":-37826.93801989935,
"Z":-3187.033979664592, "VX":2.756715786035682, "VY":-1.392507631820310, "VZ":0.142272883746829,
"Time":"2017-10-26T10:00:00Z"},
```

FIG. 9

SYSTEM AND METHOD FOR SPACE SITUATIONAL AWARENESS DEMONSTRATION

CROSS-REFERENCES TO RELATED APPLICATIONS

This application is a continuation-in-part of U.S. patent application Ser. No. 14/927,428, filed on Oct. 29, 2015, the entire content of which is incorporated herein by reference.

GOVERNMENT RIGHTS

This invention was made with Government support under Contract Nos. FA9453-15-C-0459 and FA9453-14-M-0161, awarded by the United States Air Force Research Laboratory. The U.S. Government has certain rights in this invention.

FIELD OF THE DISCLOSURE

The present disclosure generally relates to the field of the demonstration system design and, more particularly, relates to methods and systems for space situational awareness (SSA) demonstration.

BACKGROUND

The space domain today is becoming increasingly congested. The complex space environment and evolving threats present significant challenges to existing Space Situational Awareness (SSA) which needs to monitored for effective international sovereignty.

The detection, classification, and tracking of Resident Space Objects (RSO) can be assessed by a current space situational surveillance network, including ground-based radar, optical telescopes, and space-borne space surveillance assets. However, demonstrating various scenarios (or algorithms) for SSA with a flexible configurable system, including uncertainty propagation and space object tracking, is difficult.

Existing works fail to provide a flexible real-time demonstrating solution for SSA. One of the critical problems is how to process the information of a large number of space objects that vary in size, observability, and persistence. Thus, there is a need to provide methods and systems for space situational awareness (SSA) demonstration to solve one or more problems set forth above and other problems in the art.

BRIEF SUMMARY OF THE DISCLOSURE

One aspect or embodiment of the present disclosure provides a space situational awareness demonstration system. The system includes a space data collector component, for collecting space initialization data of space objects from initialized space sources and pre-processing the space initialization data; a data relocation component, for distributing the space initialization data pushed from the space data collector component into multiple streaming channels for streaming; a streaming platform for situational mapping, and reducing the space initialization data from the data relocation component to provide streamed data; a real-time analysis component, for calculating the streamed data to conduct a real-time detecting and tracking analysis of the space objects by implementing algorithms for one or more of space uncertainty propagation, space object tracking, sensor management, and collision avoidance; and a space visualization component, for displaying a visualization of space environment based on analyzed results from the real-time analysis component.

One aspect or embodiment of the present disclosure provides a space situational awareness demonstration method. The method includes collecting and pre-processing, by a space data collector component, space initialization data of space objects from initialized space sources; distributing, by a data relocation component, the space initialization data pushed from the space data collector component into multiple streaming channels; for streaming, mapping, and reducing, by a streaming platform, the space initialization data from the data relocation component to provide streamed data; calculating, by a real-time analysis component, the streamed data to conduct a real-time detecting and tracking analysis of the space objects by implementing algorithms for one or more of space uncertainty propagation, space object tracking, sensor management, and collision avoidance; and displaying, by a space visualization component, a visualization of space situational awareness (SSA) based on analyzed results from the real-time analysis component.

Optionally, the streaming platform includes: a streaming module for streaming the space initialization data from the data relocation component; and a MapReduce module for mapping, and reducing the space initialization data into a parallel computational engine.

Optionally, streaming the space initialization data includes a streaming interval that is pre-defined. The streaming interval is about 0.3 second.

Optionally, once the space initialization data are received from the data relocation component, the MapReduce module assigns tasks to process the space initialization data through different computing nodes in a networking platform.

Optionally, the space data collector component includes: a data collection module for continuously collecting the space initialization data, and storing the space initialization data in a file server waiting for processing, a pre-processing module for an acceleration and analysis of the space initialization data, and a message queuing platform for demonstrating an effectiveness of the SSA demonstration system.

Optionally, the pre-processing module converts the space initialization data into text format, the text format including satellite initial location X, Y and Z, a velocity direction and a timestamp.

Optionally, the real-time analysis component includes computational nodes to parse the streamed data and call different kinds of programs according to a task type corresponding to the algorithms.

Optionally, the visualization of the SSA includes a visualization of one or more of the space uncertainty propagation, the space object tracking, the sensor management, and the collision avoidance.

Optionally, the space visualization component collects and stores the analyzed results from the real-time analysis component.

Optionally, configuration files are based on a client input. The configuration files provide space object name, position, velocity, propagator, simulation time, sensor name, sensor location, sensor type, and task type.

BRIEF DESCRIPTION OF THE DRAWINGS

The following drawings are merely examples for illustrative purposes according to various disclosed embodiments and are not intended to limit the scope of the present disclosure.

FIG. 8 depicts an exemplary interface of a front-end visualization component in terms of sensor management in accordance with various embodiments of the present disclosure; and FIG. 9 shows an example of space initialization data uploaded from front-end in accordance with various embodiments of the present disclosure.

DETAILED DESCRIPTION

Figure 1:
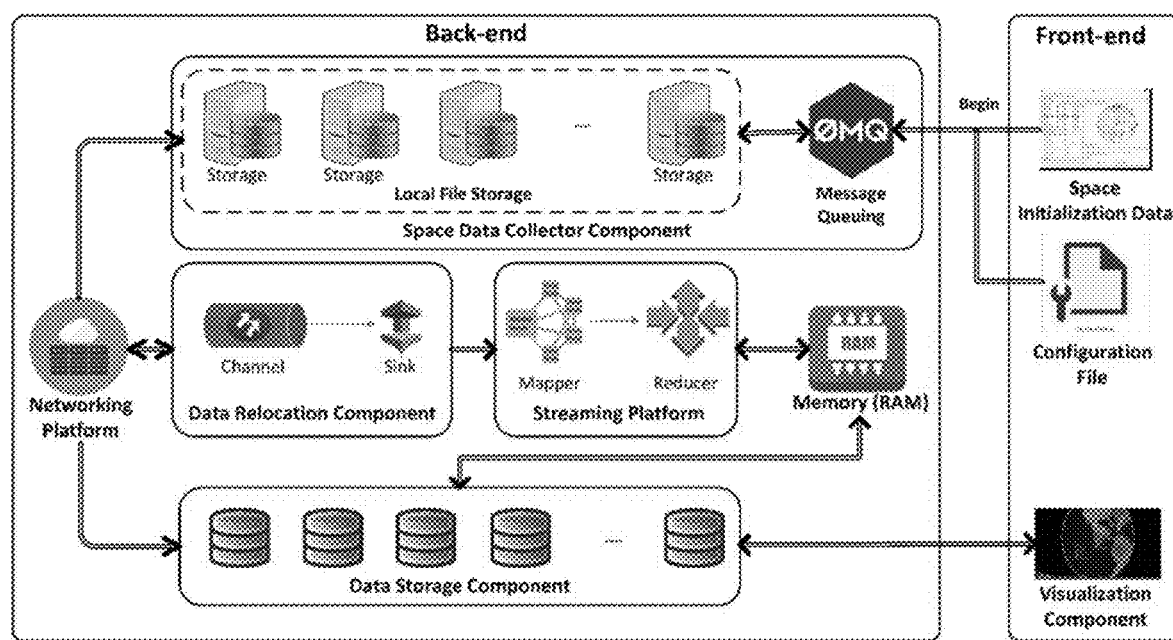
FIG. 1 depicts an implementation architecture of an exemplary space situational awareness (SSA) demonstration system in accordance with various embodiments of the present disclosure.

Reference may now be made in detail to exemplary embodiments of the disclosure, which are illustrated in the accompanying drawings. Wherever possible, the same reference numbers may be used throughout the drawings to refer to the same or like parts. In the following description, reference is made to the accompanying drawings that form a part thereof, and in which is shown by way of illustration specific exemplary embodiments in which the disclosure may be practiced. These embodiments are described in sufficient detail to enable those skilled in the art to practice the disclosure and it is to be understood that other embodiments may be utilized and that changes may be made without departing from the scope of the disclosure. The following description is, therefore, merely exemplary.

Space situational awareness (SSA) demonstration system and method are provided. For example, to demonstrate various scenarios of space situational awareness (SSA), a reliable middleware or networking platform may be provided to build the connection of various graphical client interface toolkit (front-end) and back-end computational engine (back-end). Due to the large scale of space objects, a real-time high performance data streaming platform is disclosed herein to process the information from heterogeneous sensors, including the existing space surveillance network with a 3.5-m Space Surveillance Telescope (SST), the Space Based Space Surveillance (SBSS) system, and the S-band Space Fence system; and like systems.

SSA demonstrations for various scenarios may be implemented by back-end computational engine. For example, it is often difficult for front-end visualization to have real-time communication with the back-end computation engine. A streaming platform at the back-end may rapidly analyze highly intensive space data in real-time. To deal with real-time data streaming, a data relocation component is implemented. A data relocation component can reduce and distribute binary space orbit information from various sources to real-time analysis component. The real-time analysis component is developed based on a streaming platform, which includes an efficient implementation of MapReduce module. To better conduct efficient data processing, a binary pre-processing module, which can take compressed source data directly to the SSA demonstration system.

In one embodiment, the SSA demonstration system provides an implementation architecture of front-end and back-end in a cloud-based high performance computation implementation.

The SSA demonstration may include a variety of SSA scenarios, for example, including space uncertainty propagation scenario, single/multiple space object tracking scenario, sensor management scenario, and/or collision avoidance scenario.

The streaming mechanism is designed for dealing with a large scale of space data between the front-end (e.g., including a front-end client interface) and the back-end (e.g., including a computational engine). A streaming platform rapidly analyzes highly intensive data, including space initialization data (inputted by a use for processing), in real-time. To deal with real-time data streaming, a data relocation component is implemented. The data relocation component can reduce and distribute binary space orbit information from various sources to real-time analysis component. The real-time analysis component is developed based on the streaming platform, which is an efficient implementation of a MapReduce module. To better conduct efficient data processing, a binary pre-processing module is implemented to take the compressed source data directly to the SSA demonstration system.

A high performance resident space object (RSO) detection, classification and tracking scheme is used to effectively collect, store, and analyze large amounts of uncertain satellite orbit information intrinsic to space situation awareness (SSA).

Figure 3:
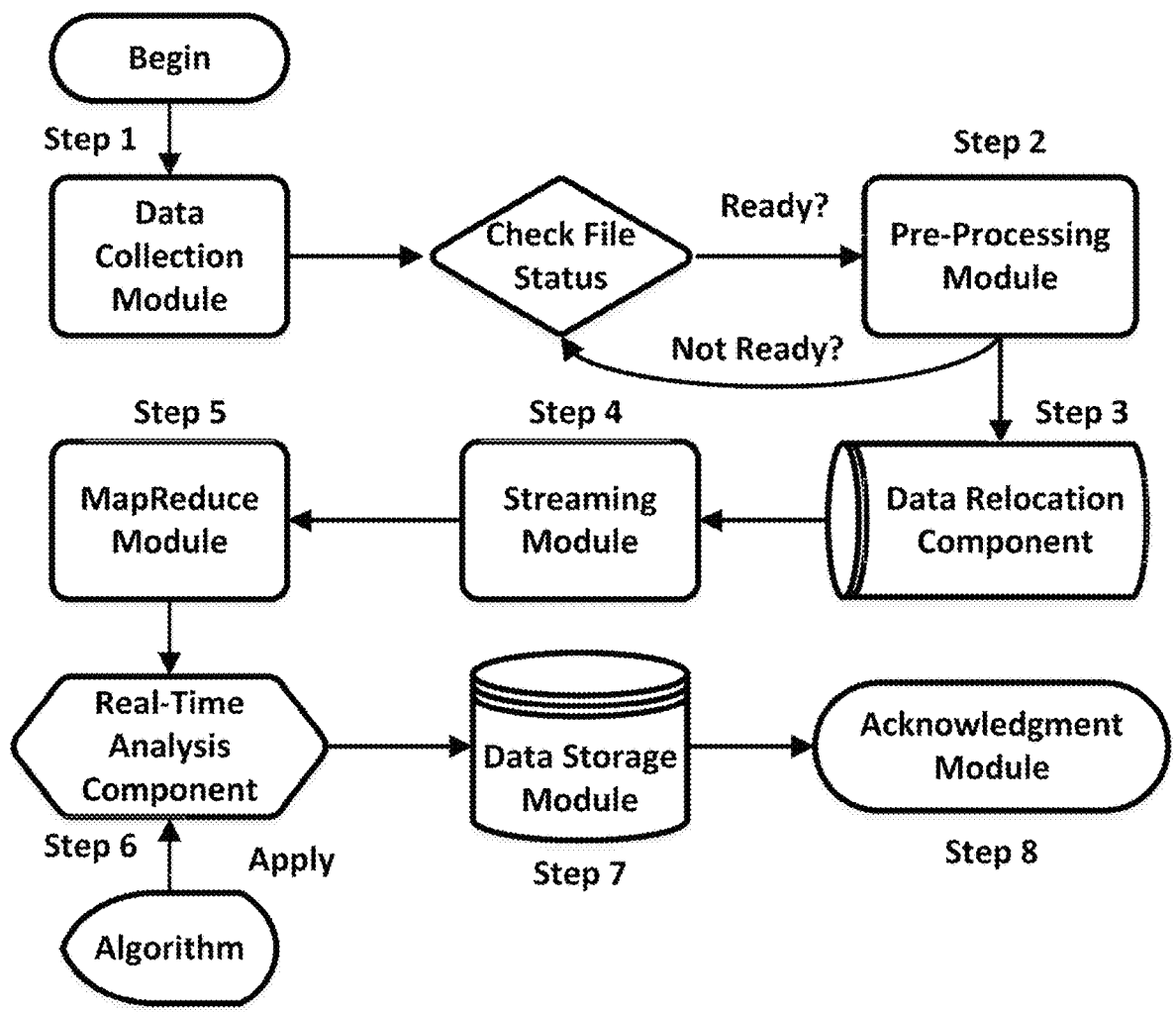
FIG. 3 depicts an exemplary SSA demonstration system in accordance with various embodiments of the present disclosure.

FIG. 1 depicts an implementation architecture of an exemplary space situational awareness (SSA) demonstration system in accordance with various embodiments of the present disclosure, while FIG. 3 depicts an exemplary SSA demonstration system in accordance with various embodiments of the present disclosure.

As shown in FIGS. 1 and 3, the SSA demonstration system may include a space data collector component (e.g., including a data collection module, a pre-processing module, and a message queuing platform), a data relocation component, a streaming platform (e.g., including a streaming module and a MapReduce module), a real-time analysis component, a networking platform, and/or a space visualization component (e.g., including a data storage module and an acknowledgement module). More components/modules/platforms may be added, and existing components/modules/platforms may be altered or omitted. The exemplary SSA demonstration system may include a back-end and a front-end as illustrated in FIG. 1.

In one embodiment, the space data collector component may first collect all the necessary data, e.g., including space initialization data and configuration file, from the initialized space sources, and store the related information into the cluster storage. Once the data is collected completely, a data relocation component may distribute the space initialization data into multiple streaming channels. Then. in a streaming platform, including a MapReduce-based implementation by the MapReduce module, maybe enabled to handle the streaming of space initialization (or raw) data by passing it into the real-time analysis component. The real-time analysis component includes a real-time calculation process for both RSO propagation prediction and tracking scenarios. With the benefit of the networking platform such as a cloud-based networking platform, large volumes of data may be processed concurrently, increasing the efficiency of the prediction and tracking process.

As disclosed herein, the use of the streaming platform to quickly process real-time data may speedup SSA detection and tracking process. Moreover, the space visualization component at the front-end can dynamically modify the tracking parameters (e.g., weighting coefficients) to evaluate the performance of SSA.

As used herein, the "space data collector component" may include a data collection module, a pre-processing module, and a message queuing platform. The message queuing platform may provide a message queuing service, for example, by a third-party service named ZeroMQ. The space initialization data, e.g., initialization data of satellite orbits, may be continuously collected by the data collection module for acceleration and for analysis by pre-processing module. After initialization data of satellite orbits is obtained, a pre-defined pre-processing module may perform data convert and/or data filter to extract useful information and then pass into high performance storage in the back end.

As used herein, the "data relocation component" provides data relocation service. The primary feature of the data relocation service is to facilitate real-time analysis by maintaining the timely transfer of satellite orbit information and dispersing them to the target components. For example, Flume is used to conduct the data relocation service. Once the Flume starts to distribute the space initialization data, such data may be split into multiple streaming channels, and then delivered to its next phase for further processing. The time interval of handling the data streaming can be changed dynamically based on the capability of data collection module. In one example, a dedicated Linux server may be used to maintain the data relocation component for conducting the real-time data streaming into the streaming platform.

As used herein, the "streaming platform" may include a streaming module and a MapReduce module, for example, including a MapReduce-based streaming engine. In an exemplary implementation, Spark may be used to handle the streaming of large scale of space data (e.g., space initialization data). The streaming platform may continuously perform streaming on the data from the data relocation component. In one embodiment, the steaming interval is pre-defined as short as about 0.3 second to process data in real time in the system. Once the data is received from data relocation component, the MapReduce module assigns the tasks to handle the incoming data and process the incoming data through different computing nodes in a networking (e.g., cloud-based) platform established herein. Eventually, in the streaming platform, the space initialization data may first be mapped and then reduced into the parallel computational engine. The MapReduce results may be prepared for further analysis in next phase.

The "streaming platform" may rapidly transfer intensive data/algorithms. The streaming platform may include a variety of interfaces for different, specific, applications for SSA demonstration scenarios. The streaming may be integrated with those interfaces and demonstration scenarios. For a certain algorithm or demonstration scenario, different MapReduce-based streaming engines may be used.

After obtaining the streamed data from the streaming platform, various SSA scenarios, such as space uncertainty propagation scenario, single/multiple space object tracking scenario, sensor management scenario, and/or collision avoidance scenario may be enabled in the back-end computational engine to detect, predict, and track the space objects in real-time, by the "real-time analysis component". Once the real-time analysis process is complete, all results may be stored into, e.g., a MySQL database for future retrieval and visualization.

As used herein, all the evaluated results from real-time analysis component may be collected and stored in the "space visualization component" in the front end, for the real-time interaction between the disclosed system and client. For example, Spring Boot, a Java-based framework for building web and enterprise applications, may be used as a front-end visualization component.

Figure 2:
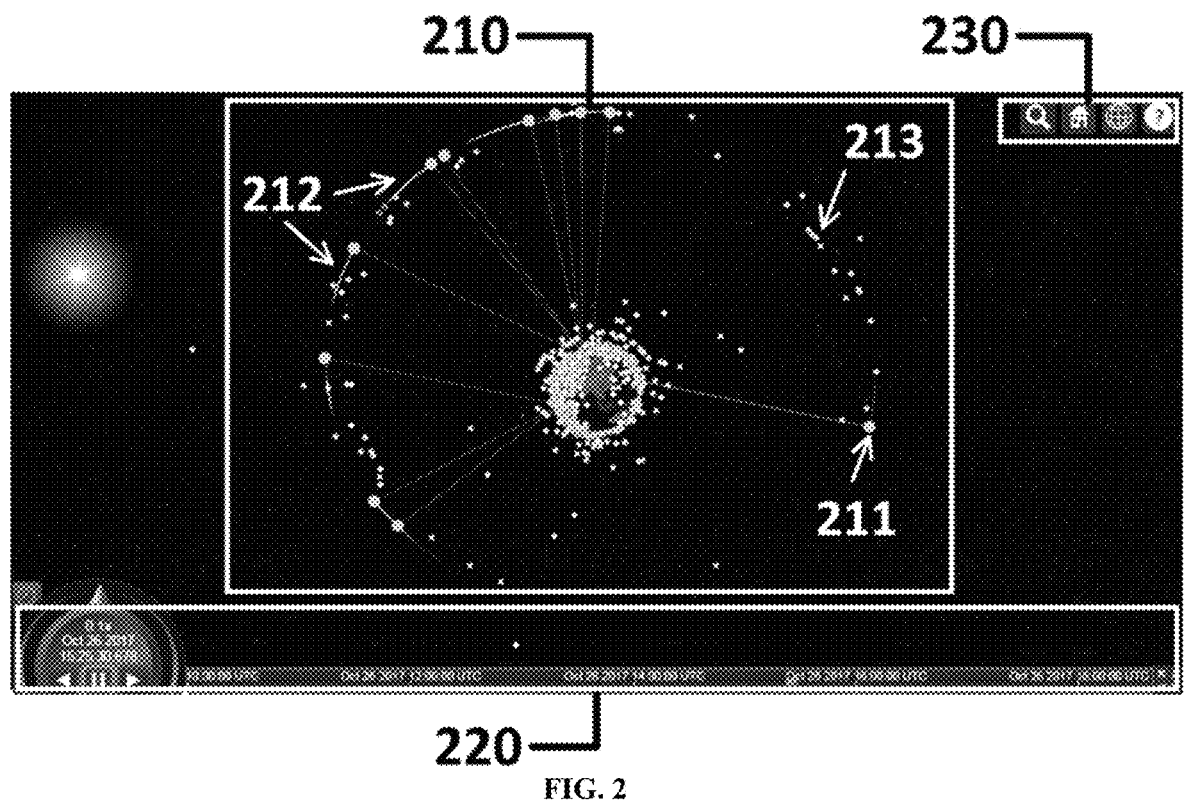
FIG. 2 depicts an exemplary result of a front-end visualization component in regard with detection and tracking in accordance with various embodiments of the present disclosure.

FIG. 2 depicts an exemplary result of a front-end visualization component in regard with detection and tracking in accordance with various embodiments of the present disclosure. As illustrated, the exemplary results of a front-end visualization component may include: main views 210 of front-end visualization for displaying different SSA scenarios, including a tracking trajectory 212, monitored satellites 211 on the tracking trajectory 212, other space objects (e.g., other satellites) 213, a time controller 220 for the front-end visualization, and a control panel 230 for switching two dimensional (2D) and three dimensional (3D) modes of viewing.

The client can dynamically update the prediction and tracking strategies in this phase using the "space visualization component". By changing different parameters in multiple space object propagation and tracking methods, the real-time analyzed results can be obtained by collection dashboard. If any unexpected satellite orbit information, for example, one satellite is about to collide with another space object, is tracked, an alert may be triggered to acknowledge the administrator using the acknowledgment module.

As used herein, the "networking platform" may be a cloud-based platform to provide a system environment enabled to handle all of the data processing. In an exemplary system environment, to achieve better performance, a private cloud environment is built up with 4× Dell PowerEdge clusters, each cluster installed with 5 physical Virtual Machines (VMs) running Ubuntu 16.04 server OS.

On an application layer on the client, a cloud-based management tool named Cloudera system is installed for dealing with large data analysis. Cloudera system automatically integrates data relocation, streaming, analysis and front-end visualization components.

In one embodiment, initially, the data collection module may store space initialization data on a specified file server, waiting for further processing. The pre-processing module is a java application which is running on an individual Linux server. The pre-processing module keeps checking the status of stored data on the file server, and then processes the existing files immediately when the streaming resources are ready to provide pre-processed results (e.g., pre-processed space initialization data). After that, the pre-processed results may be pushed to the data relocation component as an input. Data relocation component may disperse and stream the input data to perform further analysis. Once the data is mapped and reduced by the MapReduce module, real-time analysis module is enabled to evaluate the RSO tracking and prediction. Finally, all the output data may be stored in data storage module (e.g., a MySQL database) and then activate acknowledgment module to display the visualization of SSA. If any unexpected tracking performance is detected, a real-time alert, for example, by emails or text notifications may be trigged to acknowledge the system administrator.

Referring back to the exemplary SSA demonstration system shown in FIG. 3, in Step 1, the data collection module may collect original satellite initialization data from a data source, which is designed to be realistic, natural and challenging for orbit propagation domains in terms of its high computation complexity and accuracy. A message queuing service (e.g., ZeroMQ) is used to collect data for demonstrating the effectiveness of the disclosed system. For example, the binary format is applied for processing input sources by ZeroMQ and all the initialization data are categorized carefully before streaming. ZeroMQ extracts the necessary information from obtained data sources before sending to next step.

In Step 2, for the pre-processing module, space initialization data collected from different sources may have different formats (e.g., binary or text format). FIG. 9 shows an example of space initialization data uploaded from front-end in accordance with various embodiments of the present disclosure.

Note that it's impossible to execute the binary data directly when Spark, as a streaming module, is used to handle the data streaming. In this case, the binary data must be converted to text format first by the pre-processing module. A java application is developed to extract the desired configuration information from the original binary file.

A configuration file may list all necessary items for information required to demonstrate the SSA algorithms/scenarios. For example, the configuration file may include the space object name, position, velocity, propagator, simulation time, sensor name, sensor location, sensor type, task type. Sensor type includes a ground-based electro-optical sensor, space-based optical sensor, and a ground-based radar sensor. Task type includes uncertainty propagation, single/multiple space object tracking, sensor management, and/or collision detection/avoidance.

The data relocation component may use the converted text format from the pre-processing module in the step 3. For example, the pre-processing module must spend a lot of time on source data formatting, which may result in slowing down system performance, especially when dealing with massive amount of data streaming. For example, on a non-streaming system, it takes approximately 8 hours to convert 500 GB binary data file to a structured text file by using a personal computer with the configuration of Intel i7 6700 k Processor, 16 GB RAM, and 1 TB SSD. To solve this problem, as disclosed herein, an online binary pre-processing module is developed to transfer binary data files as input directly, and then push to the pre-processing step. Multiple parallel computing nodes may be enabled at this moment to handle all the data transformation. With massive amounts of network traffic data, java-jar command may be used to compress all of the space data files into a jar archive file. The disclosed system provides the capacity to stream data into the system for processing with un-preferred data format (e.g., binary data format). To this end, the streaming feature is utilized to stream the massive jar file into the disclosed system. As the data arrives, the data may be decompressed and distributed to all nodes for pre-processing. After pre-processing, all the intermediate output are converted into text format, including satellite initial location X, Y and Z, velocity direction and timestamp, which is a unified format to use in following data relocation service. By using the unified format, the data relocation can be significantly improved, dramatically reducing the processing time in the parallel processing system.

In Step 3 of FIG. 3, for the data relocation component, to enable real-time streaming data analysis, a data relocation component (or server) is built to efficiently move a large amount of data from input sources to a centralized data storage. For example, Flume service may be used as an example for relocating the data. The Flume service is a distributed service developed by Apache for collecting, aggregating and transferring large data sets. The principle of Flume service is to use an extensible data model to the support online analytic applications based on streaming data flows. Specifically, many agents are operated by Flume server. Each agent is developed as a Java component which contains a source, channel, and sink. The sink is used for directly flowing data to different destinations. A unit of data flows is delivered from a source into a Flume agent and then reach channel and sink components for further processing.

The data relocation service may include the following. (i) A streaming event message is the fundamental unit of data transported by data relocation service from source to destination. (ii) The streaming event message may be received by sources from a specified location and then sent to one or more channels. The streaming event message may be converted into an event and prepared for future transferring. (iii) A channel is a passive component to buffer the streaming events when they are drained by sinks. The channel may keep intermediately storing the event data until it is consumed in the sink. (iv) A sink is an active component to remove events from a channel and transmit them to a centralized data storage, such as Hadoop Distributed File System (HDFS), for further analysis in our system.

In Step 4, for the streaming module: to better handle a large scale of data streaming, a real-time streaming may be conducted by using Spark to handle the processed data in real time. The time intervals of spark executions are pre-set, e.g., about 0.3 second. The main streaming process of the system is therefore enabled.

In Step 5, for the MapReduce module, MapReduce feature is enabled to conduct the parallel execution. Data mapping is the first step to map raw (or space initialization) data to pre-defined key/value pairs, then data reducing component can use the mapping output for further task assignment. With the shuffle and sorting processes, the intermediate processed results that are sitting in memory may be further aggregated and pushed into data reducing component Reduce( ). Based on the defined key/value pair by the data mapping, data reducer can combine the processed individual results and the individual intermediate outputs to generate the final result. For example, the assigned task access volume of the particular satellite orbit information in different intermediate memory can be summarized to illustrate the total space object situation.

Figure 4:
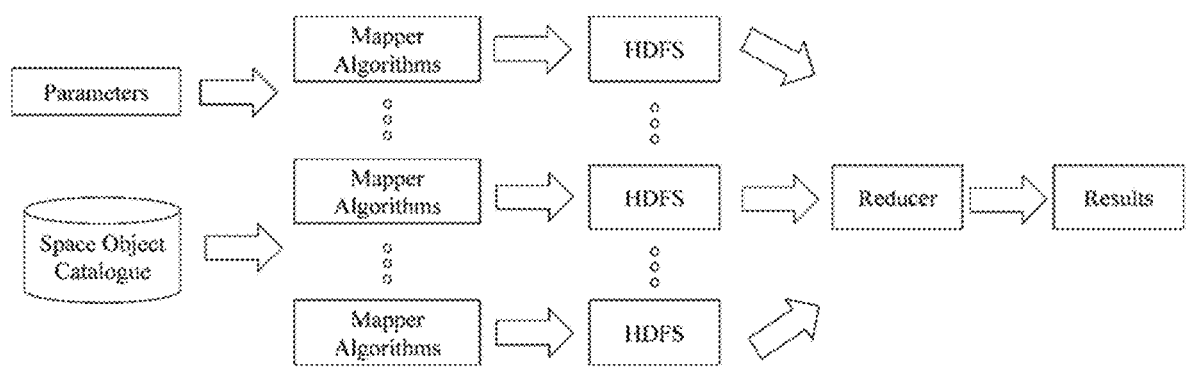
FIG. 4 depicts an exemplary MapReduce framework in accordance with various embodiments of the present disclosure.

For example, FIG. 4 depicts an exemplary MapReduce framework with real-time analysis implementation for space uncertainty propagation and space object tracking in accordance with various embodiments of the present disclosure. In one example, Spark can process data in small batches and transform them into RDD (Resilient Distributed Data) to hold a collection of data elements used for parallel processing. For a specific application, the Name Node may split the data of the space objects. Each space object can be processed independently and the identifier of the space object can be used as the key. The sorting is carried out using the key number and the reducer joins all separated data. For each mapper, the input contains a single space object or a small group of space objects. The mappers use various algorithms to extract various features of the space object in parallel using the developed algorithms with slave works and their output are stored in Hadoop Distributed File System (HDFS).

In Step 6, for the real-time analysis component, after data mapping and reducing, scenarios/algorithms, including space uncertainty propagation algorithm, space object tracking algorithm, sensor management strategy and collision avoidance monitoring, are implemented to conduct the real-time detecting and tracking analysis to achieve better performance on accuracy and efficiency of multiple space object propagation and tracking.

The computational nodes in the real-time analysis component may parse the streamed data and call different kinds of programs according to the task type. For example, if the task is for uncertainty propagation, the uncertainty propagation program may be used.

In Step 7, for the data storage module, after the real-time analysis module, data storage, such as a MySQL database, may be used to store the final results for cost efficiency. To be specific, a cluster server may be established with distributed and share-nothing architecture to maintain a high performance of data storing and retrieving.

In Step 8, for the acknowledgment module, all RSO prediction and tracking results are captured and stored in the database. Once any unexpected or malicious situation is detected, emails or text message notifications may be triggered to acknowledge system administrators and data operation center may receive the detailed information immediately. Then further necessary actions such as collision avoidance and orbit control are enabled to be taken.

For example, when the work is done on the back-end (or back-end computational engine), the computational data is transferred back to the front-end side via message passing channel. To achieve real-time performance, data may be transferred considering the simulation time, e.g., using a coarse-refine manner. At the beginning of the transmitting, the data at a different time is sampled. Only sampled data is transmitted first to quickly render the front-end visualization. Later, all data are transmitted to refine the rendering of the front-end visualization.

To show results of uncertainty propagation, space object tracking, sensor management and collision avoidance, different strategies may be used. Specifically, random points are used to represent the uncertainty of the space object. For the space object tracking demonstration, the true and estimated trajectories are shown simultaneously. The difference between the true and estimation trajectories are stored in temporary tables in the database of the front-end.

Uncertainty Propagation Scenario

There are more than 20,000 space objects are tracked by the U.S. space surveillance network (SSN). With the increasing number of space objects, it is important to know the state of space objects in order to avoid a collision and protect important space assets.

Due to a large number of space objects and the small number of available sensors, the number of observations of the space objects, such as radar observations, is not sufficient. Hence, it is necessary to guess or predict the future state of the space object based on the state of the space object now. Because of the inherent uncertainty of the sensor observation, the state of the space object is often described by the probability distribution. The uncertainty propagation is thus to predict the probability distribution of the future state of the space object. Note that the uncertainty propagation is necessary when no observations of sensors are available.

Figure 6:
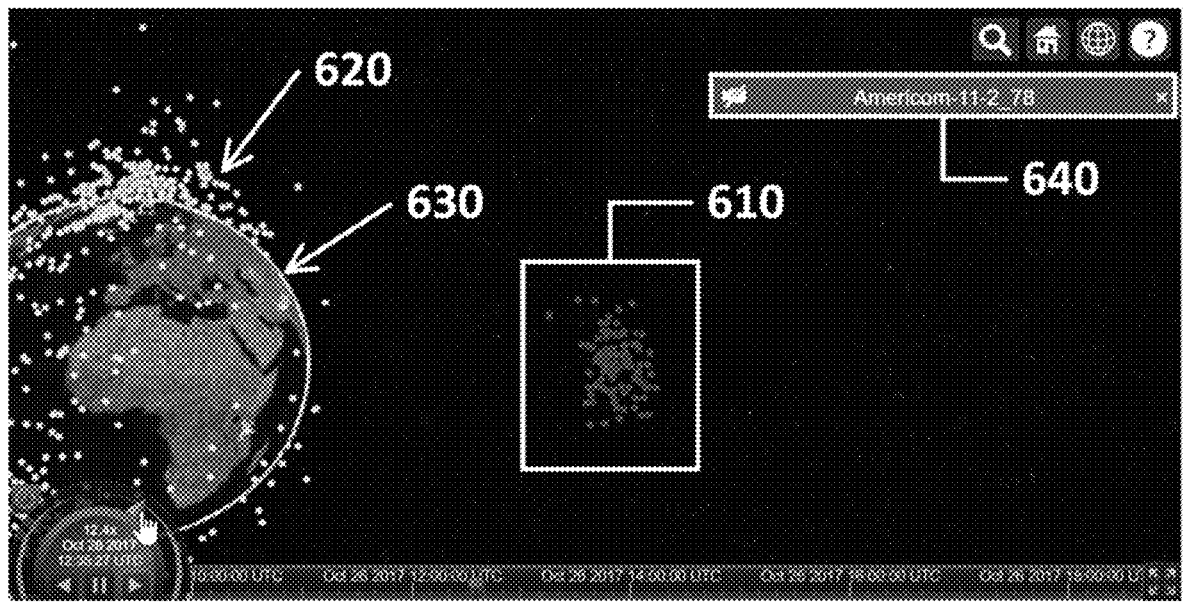
FIG. 6 depicts an exemplary interface of a front-end visualization component in terms of space uncertainty propagation in accordance with various embodiments of the present disclosure.

For example, FIG. 6 depicts an exemplary interface of a front-end visualization component in terms of space uncertainty propagation in accordance with various embodiments of the present disclosure. As illustrated, the exemplary interface may include monitored satellites 610, background space objects 620, and a name mark 640 of the monitored satellite. A point cloud of the monitored satellites 610 represents the propagation estimation of the satellite named Americom-11. About 100 possible candidate positions are all calculated and shown in the point cloud of the monitored satellites 610.

Space Object Tracking Scenario

Figure 7:
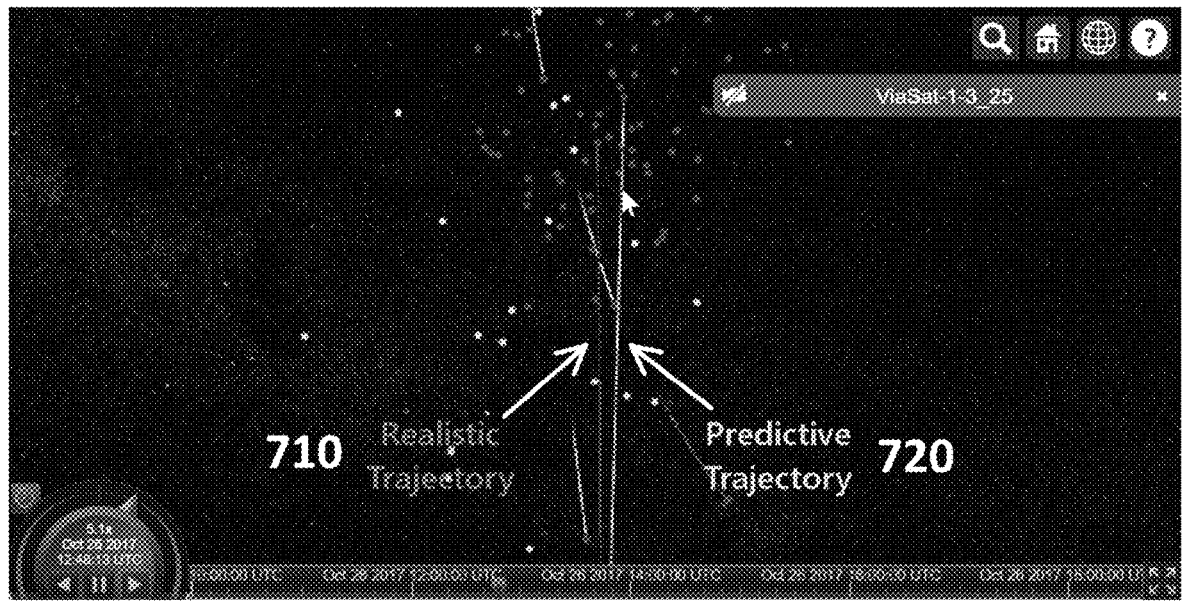
FIG. 7 depicts an exemplary interface of a front-end visualization component in terms of space object tracking in accordance with various embodiments of the present disclosure.

When sensor observations are available, the space object tracking uses the observation of sensors to update the state of the space object. For example, FIG. 7 depicts an exemplary interface of a front-end visualization component in terms of space object tracking. In the detail visualization, for each monitored satellite, the real-time tracking is conducted. By zooming-in the space view, two curved trajectories following the satellites can be clearly seen, for example, including predictive tracking 720 after a real-time calculation of the diffusion-based space object tracking and realistic orbital trajectory 710. The two curves 710, 720 illustrated in FIG. 7 appear similar.

Sensor Management Scenario

The sensor management aims to use a limited number of sensors efficiently. Specifically, the sensor management aims to reduce the overall uncertainty of space objects by allocating specific sensors to observe specific space objects. Roughly speaking, the gain is large if the difference of the uncertainty before using the sensor observation and after using the sensor observation. The sensor management, hence, aims to achieve maximum gain. For example, FIG. 8 presents an exemplary interface of a front-end visualization component in terms of sensor management. The optimal sensor communications between monitored satellites and ground stations are calculated based on available resource allocation. For example, FIG. 8 shows candidate routes 810 of sensor management. Each monitored satellite may choose a best route to communicate having a selected route name 820.

Collision Avoidance Scenario

Figure 5:
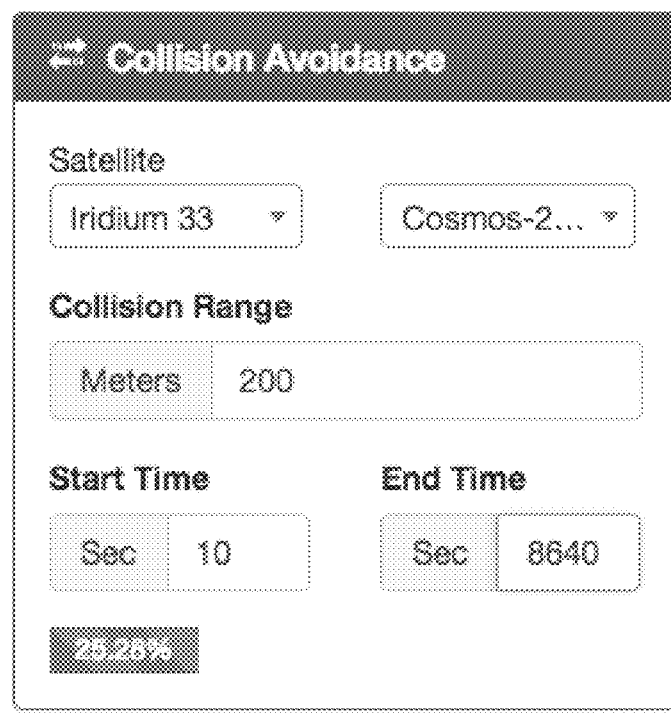
FIG. 5 shows an example of a client input for SSA of collision avoidance in accordance with various embodiments of the present disclosure.

FIG. 5 shows an example of the client input for collision avoidance. The client can choose arbitrary two satellites to actively detect the collision possibility and risk. To help clients actively detect the potential collision, highly possibility potential collision pairs, are recommended by the back-end algorithms. In addition, clients can choose the collision range and time windows parameters to specify the range and collision time parameters for the collision algorithms.

The present disclosure also provides asynchronous GPU-CPU coupled collision probability computation of space objects. For example, potential collision among a large number of space objects, such as orbit satellites, may be monitored based on asynchronous exchange information between a GPU and CPU and adaptive parallel computing implementation on GPU.

For example, propagating or predicting of multiple satellites may be performed within the framework of a Compute Unified Device Architecture (CUDA) based parallel computing infrastructure for the application of collision detection and monitoring. The disclosed method and system may innovate an operator-friendly GUI for observing and monitoring the orbit propagation result (e.g., in a form of point cloud) in real-time. The disclosed parallel computing based approach has a general purpose in the sense that the same idea can be applied and extended to other types of methods, such as Stochastic Collocation.

It is shown that the application of parallel computing structure based on CUDA Basic Linear Algebra Subroutines (cuBLAS) leading to a real-time outcome of visualization and rendering compared with situations when the visualization work flow is applied in CPU. Moreover, the obtained propagation results for the multiple satellites may indicate that the parallel-based approach provides dramatically improved, speed-up performance in real-time and under realistic conditions.

Disclosed herein provides a method for predicting a collision probability among a multitude of space objects with substantial real-time prediction for collision probability for a large scale space objects based on GPU-CPU coupled parallel computing framework. A QMC method is used and the individual space objects are allocated in different threads adaptively in GPU for the parallel computing, which includes generation of the Gaussian random numbers, for example, using curandGenerateNormal, and the propagation of the space object and the collision probability prediction in parallel implementation using the GPU. In addition, the results of the collision probability are reported and the possible position of space objects is visualized through OpenGL. The application programming interface (API) is used to interact with GPU, to achieve hardware-accelerated rendering.

A GPU is a processor attached to a graphic card for floating point operations. A graphics accelerator incorporates custom microchips which contain special mathematical operations commonly used in graphic rendering. Graphic rendering is a process of generating an image from a two-dimensional (2D) or 3D model or from any models that are collectively named as a scene file, by means of computer programs. The result produced from such model can be named as rendering. The efficiency of the microchips, therefore, determines the effectiveness of the graphics accelerator.

The device GPU implements a number of graphics primitive operations much faster than the host CPU. Many of them feature a linear time complexity in the number of pixels. Thus, they are particularly well-suited for real-time point computation. Parallel GPUs may make computational inroads against the CPU as a subfield of research called General Purpose Computing on GPU.

CUDA® is a parallel computing platform and programming model invented by NVIDIA. It enables dramatic increases in computing performance by harnessing the power of the GPU.

The CUDA platform is the most widely adopted programming model for GPU computing, with Open Computing Language (OpenCL) also being offered as an open standard. OpenCL is a framework for writing programs which execute across heterogeneous platforms including CPUs, GPUs, Digital Signal Processors (DSPs), Field-Programmable Gate Arrays (FPGAs) and other processors.

A GPU is usually treated as a parallel computer with shared memory architecture. As all processors of the GPU can share data within a global memory space, which perfectly fits the data parallelism. However, because of its applied shared memory model, the major bottleneck is memory communication between the host (e.g., CPU) and device (e.g., GPU). As such, unnecessary data transfer between host and device should be avoided as much as possible. In other words, most of the data computation should take place in GPU without interruption. Since data sharing between GPU cores is time-consuming, the data throughput requirement makes current GPUs inappropriate for solving a bunch of small array operation problems. Two principle rules of GPU programming should be followed: 1) to parallelize a large number of scalar/vector addition/multiplications if possible, and 2) to reduce communications between host and devices as much as possible.

In the present disclosure, asynchronous transmission based on Hyper-Q is implemented in the system to reduce the communications between the host and the device.

Multiprocessor (MP) model used in CUDA is called single-instruction multiple-thread (SIMT). In SIMT, MP allocates each thread to one scalar processor (SP) core, and each thread operates independently with its own instruction address and register state. The concurrent threads per MP are created, managed and executed in hardware with no scheduling overhead.

Threads may form the structure of blocks and grids logically. A grid is a set of blocks, while a block is a set of threads. The block and grid sizes are programmatically controlled according to the load of the computation. The optimization of the GPU execution relies on the parameters configuration. The first parameter is the grid size which defines the number of blocks per grid and the second parameter is the block size which defines the number of threads per block. From the general programming guideline of NVIDIA, the key factor of the configuration is to keep the entire GPU busy. The number of blocks in a grid is supposed to be greater than the number of multiprocessors (MPs) so that all MPs have at least one block to execute, and all the active running blocks per MP may keep the hardware busy and thus the system bypasses the relatively time-consuming thread synchronization.

For inevitable communication between CPU and GPU of the system, Hyper-Q is implemented in the disclosed system. Hyper-Q enables multiple CPU threads or processes to launch work simultaneously on a single GPU, thereby dramatically increasing GPU utilization and slashing CPU idle times. This simultaneity feature increases the total number of "connections" between the host CPU and the device GPU by allowing 32 simultaneous, hardware-managed connections (e.g., see FIG. 10), compared to the single connection available with GPUs without Hyper-Q.

For visualization and rendering of the space object propagation, OpenGL is a set of standards for high-performance processing of 2D and 3D graphics on GPU for a wide variety of applications. OpenGL provides fast rendering for preview (Fast Draft mode). OpenGL enables GPU to provide acceleration to display certain interface elements, and for ray-traced 3D rendering.

For a space object whose orbit has been determined from the past observations, the future state of this space object can be predicted by orbital mechanics. However, it is impossible to determine the exact or more accurate status of the space object due to various perturbations in the space. To predict more accurate states of the space object, a large number of representing points in the modeling are generated based on the given parameters of space objects. Then each possible state of the space object may be propagated following the orbital mechanics. The collision probability among space objects thus can be predicted. The QMC method is used to randomly generate random samples or random points to represent the initial possible state of the space object. Without loss of generality, the possible states of the space object are assumed to follow Gaussian distribution, which can be described by the mean and covariance. Under this assumption, the possible initial state of the space object x(i) can be obtained via the QMC method.

For example, a number N of random points $\varepsilon^{(i)}$ according to the standard Gaussian distribution may be generated. Then a linear transformation is applied to obtain $x^{(i)}$, which corresponds to a general Gaussian distribution. The points $\varepsilon^{(i)}$ using the QMC method are generated as random numbers drawn from the standard Gaussian distribution. Given a set of N initial possible states (samples) of the space objects, the states of the space object are updated via orbit propagation.

Figure 10:
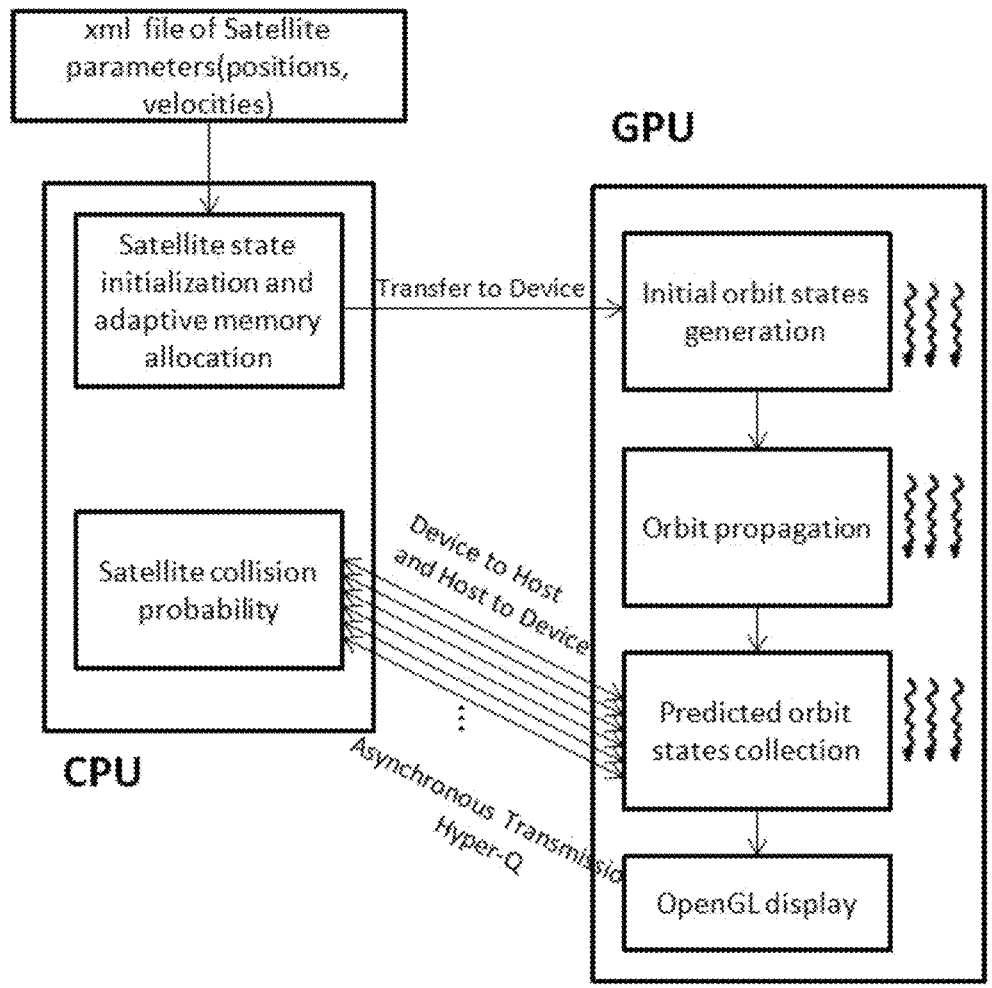
FIG. 10 depicts an exemplary method for predicting collision probability of space objects in accordance with various embodiments of present disclosure.

FIG. 10 depicts an exemplary method for predicting collision probability of space objects in accordance with various embodiments of present disclosure.

As shown in FIG. 10, an .xml based configuration file, which includes all the initial parameters of space objects, is used to provide the information required for predicting the space objects in future. The xml file includes the initial positions and velocities of the space objects, such as satellites, in the form of matrices. For instance, if there are N=500 satellites, the initial matrix is 500*6. In other words, 6 dimension vectors including initialized positions and velocities of the RSOs are loaded. RSOs may often include a satellite or space junk, orbiting the earth. Thus it can be expected that the xml-based configuration file has high potential to be extended to cloud based or internet based input data.

Rather than writing the data into memory directly, this xml-based structure enables the data retrieval and modification in real-time. According to the number of space objects, the disclosed method and system may allocate the memory space in CPU and GPU adaptively. The adaptive memory allocation is performed from the beginning when the system is turned on till the collision probability is calculated using CUDA. The disclosed method and system may involve updating the states of space object via orbit propagation in an online manner or in a real-time manner. The modification to the number or the initial parameters (e.g., positions and/or velocities) of the satellites is applied easily by manually adding or deleting one line or modifying the numbers accordingly in the xml file. Thus the developed framework and system is designed to be adaptively deal with the situation that different number of space object and different parameters are involved. For example, the device memory is allocated adaptively according to the number of the satellites.

Referring to FIG. 10, a parallel computing infrastructure is utilized to generate initial possible states of space objects and propagate the states of space objects. It can be seen that the parallel implementation of the time-consuming algorithm running in the GPU, dramatically increases the efficiency of the collision probability calculation. The well-known attractive features of parallel computing structure using GPU include on-demand scalability of highly available and reliable computing resources and the hardware designed to rapidly manipulate and alter memory to accelerate the creation of computing units in a frame buffer intended for output to a display.

In an exemplary embodiment, the implementation of Hyper-Q is used to update the states of space objects, which are visualized and rendered through the interaction between Host and Device. Hyper-Q is a flexible solution which allows connections for both CUDA streams and Message Passing Interface (MPI) processes, or even threads from within a process. Existing applications that were previously limited by false dependencies can see a dramatic performance increase without changing any existing code. The Hyper-Q computational kernel and its implementation also uses NVIDIA CUDA programming model. It is also worth to note that CUDA-based visualization and rendering is also a speed-up performance of the system compared with conventional computer graphic visualization method. Both Hyper-Q and the highly parallelized CUDA based visualization and rendering may use non-real-time algorithm to achieve real-time performance. In other words, the processing speed is drastically improved by the asynchronous transmission based on Hyper-Q and parallel implementation based on CUDA.

An example of a GPU suitable for the disclosed method and system is NVIDIA's model Quadro K2000 which has 192 CUDA cores and 1 GB frame buffer. The great number of CUDA cores and desired capacity of frame buffer are the guarantee of the representation of a large number of random possible states for space objects and the long-term propagation of a large number of space objects.

Example: CUDA Based Gaussian Random Numbers Generation

QMC method provides approximate numerical solutions to solve the problems that would be difficult to solve exactly. The defining characteristic of QMC simulation is the use of multiple independent trials, each driven by some random process. The results of all the independent trials are then combined to extract the average answer, relying on the Law of the Large Numbers, which states that as more trials are combined, the average answer will converge on the true answer. The independent trials are naturally parallelizable, and they typically consist of dense numeric operations, so CUDA provide an ideal platform for Monte Carlo based simulations.

The CUDA CUBLAS (CUDA Basic Linear Algebra Subroutines) library provides high performance computing implementation for the Basic Linear Algebra Subprograms (BLAS) level 1 to level 3 operations. Thus, our parallel algorithms are designed to utilize the existing parallel linear algebra library. The flow chart of the GPU implementation on QMC random numbers generation and orbit propagation algorithm is shown in FIG. 10. It is similar to the serial version although it has to send data back and forth between host and device. To fully take advantage of GPU computing power and reduce unnecessary host/device communication overhead, the large size of array/vector multiplication, such as the first-order differential equations, acceleration perturbation modeling and equations modeling of space object motion are conducted on GPU, while the manipulations of relatively small constant computation is left in CPU.

Figure 11:
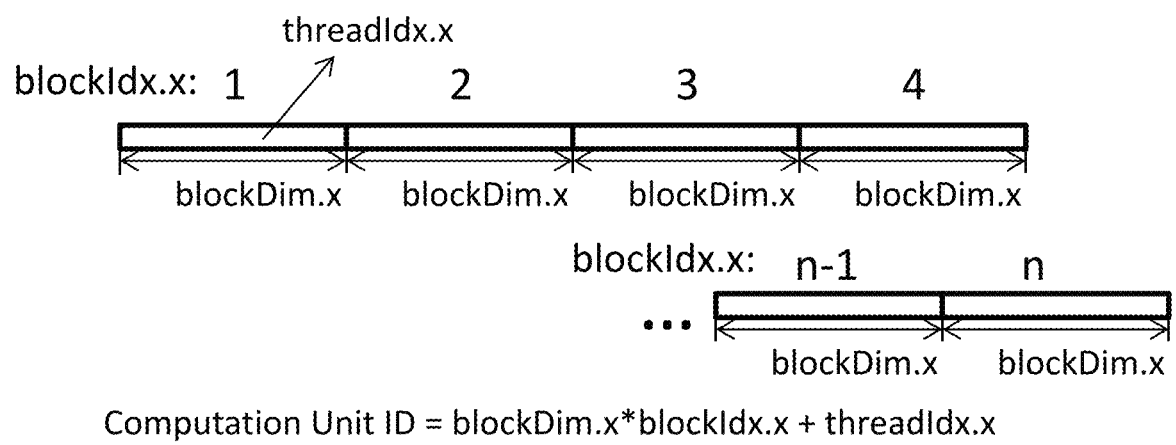
FIG. 11 depicts an exemplary layout of the Thread Block Grid for random numbers generation and orbit propagation parallel algorithm in accordance with various embodiments of present disclosure.

FIG. 11 gives the detail layout of the thread block grid for the random numbers generation and orbit propagation based on separate linear computation. As shown in FIG. 11, an exemplary layout of a grid computation unit in GPU is provided. The multiplication of block numbers and thread numbers represents the number of possible states of the space object while the block number and thread number are set up at the beginning of the memory allocation adaptively.

It is assumed that the initial position and velocity of an Earth-orbiting space object are denoted by $r^I=[xyz]^T$ and $v^I=[v_x v_y v_z]^T$ respectively, meaning that six dimensions of random numbers generators are necessary. In other words, for each possible state of the satellite object, six Thread Block Grids are aligned consecutively and performed in the kernel. The memory on device used to save the random numbers will be allocated in advance adaptively. For instance, 10000 possible states of the space object are generated in the memory allocation and partitioned into blocks of threads that execute independently from each other. In one embodiment, the number of blocks and threads are set to be about 50 and 200, respectively. Thus, the memory in GPU is allocated adaptively as cudaMalloc ((void**)&randomnums, (6*threadNumbers*blockNumbers)*sizeof(float)), where randomnums is a vector used to save the random numbers in GPU, threadNumbers and blockNumbers are the number of threads (200 in this case) and number of blocks (50 in this case) respectively. Since the parallel computation in this example is scalar/vector addition/multiplications, the thread index 'threadIdx' is identified using a one-dimensional thread block. The index of a thread and its thread ID relate to each other in a straightforward way: for a one-dimensional block, they are the same, Computation Unit ID=blockDim.x*blockIdx.x+threadIdx.x.

To fully take advantage of the GPU computing power, the generation of random numbers and the orbit propagation are conducted in GPU to reduce the host/device communication overheard. However, there is a limit to the number of threads per block, since all threads of a block are expected to reside on the same processor core and must share the limited memory resources of that core. On current GPUs, a thread block may contain up to 1024 threads. In an exemplary embodiment, for computation convenience, a thread block may include 1000 threads. Also, a kernel can be executed by multiple equally-shaped thread blocks, so that the total number of threads is equal to the number of threads per block times the number of threads per block times the number of blocks.

Figure 12:
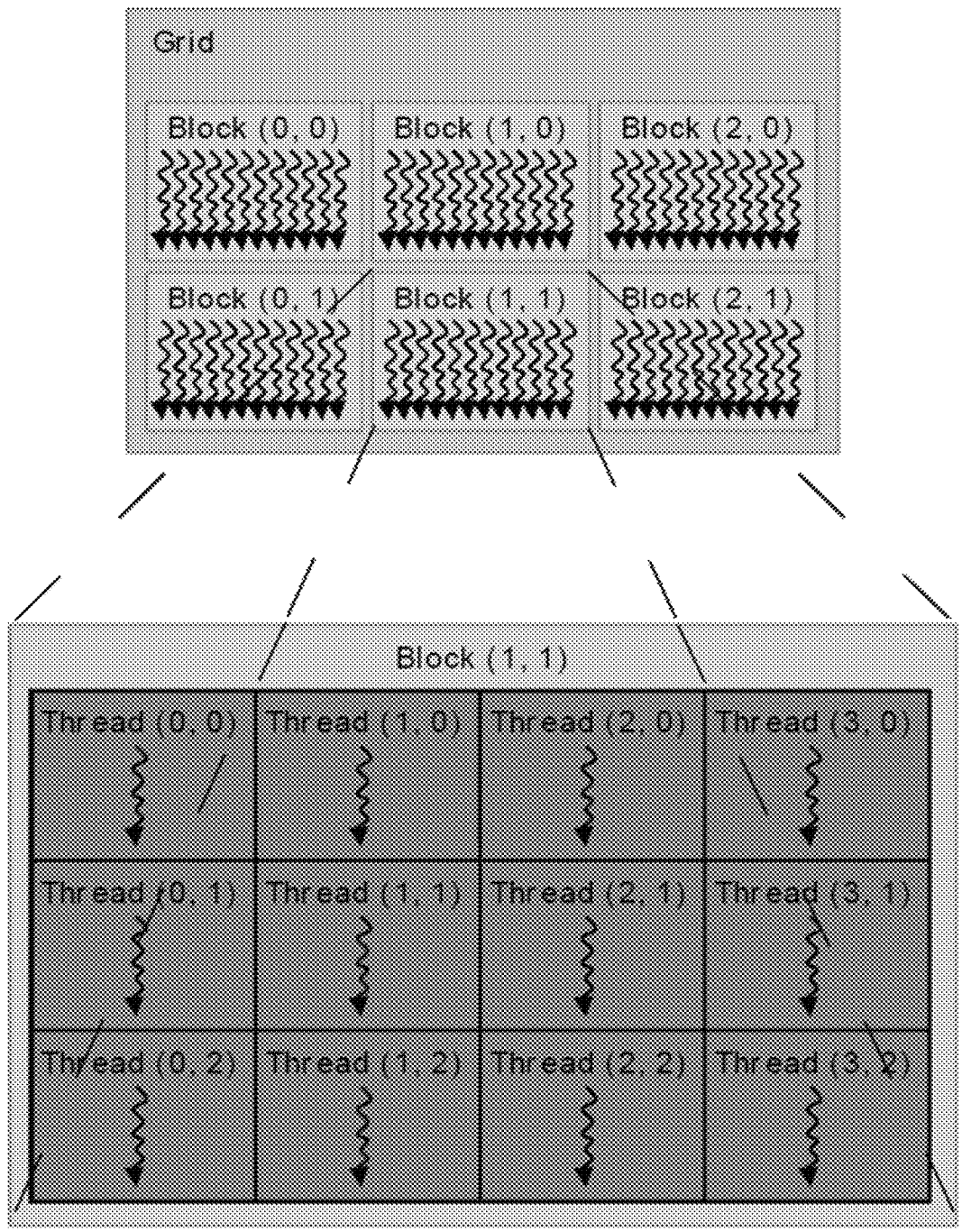
FIG. 12 depicts an exemplary architecture of the Thread Block of multiple Grids in accordance with various embodiments of present disclosure.

Blocks are organized into a one-dimensional or two-dimensional grid of thread blocks as illustrated in FIG. 12. The number of thread blocks in a grid is usually dictated by the size of the data being processed or the number of processors in the system, which it can greatly exceed.

Example: CUDA Based Satellite Orbit Propagation

In Earth orbital space object propagation, the governing equations of the two-body problem with the $J_2$ perturbation are given by equations $\dot{r}=v$ and $\dot{v}=-\mu/r^3+a_{J_2}$.

where r and v denote the position vector and velocity vector, respectively; $a_{J_2}$ is the acceleration due to the Earth's oblateness, given by $$a_{J_2} = -\frac{3}{2} J_2 \left(\frac{R_E}{r}\right)^2 \begin{bmatrix} x\left(5\frac{z^2}{r^2}-1\right) \\ y\left(5\frac{z^2}{r^2}-1\right) \\ z\left(5\frac{z^2}{r^2}-3\right) \end{bmatrix},$$

where $R_E$ is the radius of the Earth, $J_2$ is the second zonal harmonic coefficient, $r=\|r\|=\sqrt{x^2+y^2+z^2}$, and x, y and z are the component of r. The initial values and parameters of the two-body problem are given in the satellite parameters .xml file as shown in FIG. 1. The xml file contains the initial positions and velocities of the satellites in the form of matrices. For instance, if there are 500 satellites, the initial matrix is 500*6. The above equations are used to propagate the possible states of space objects, which are implemented by the parallel programming using CUDA C++.

In FIG. 10, three exemplary computational kernels include an initial-orbit-state generation kernel, an orbit propagation kernel based on CUBLAS, and a predicted-orbit-state collection kernel. These three computational kernels take most of the numerical computation of the system. The data communications among these three kernels take place in GPU.

Figure 13:
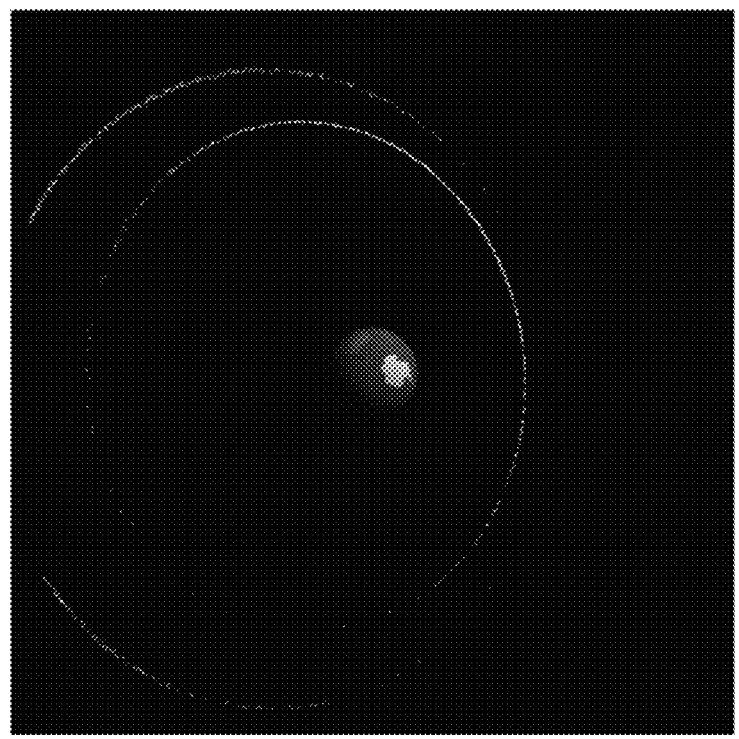
FIG. 13 depicts an visualization and rendering example of possible states of two space objects in accordance with various embodiments of present disclosure.

For example, as illustrated in FIG. 10, the initial orbit states are represented by a large number of possible states, which are randomly generated by initial-orbit-state generation kernel. The generated possible states of space objects in device GPU memory are directly transferred into the orbit propagation kernel for computation using the above-discussed equations. Thus the predicted or propagated positions and velocities of the space objects by the orbit propagation kernel is updated, collected by predicted-orbit-state collection kernel, and then transferred for visualization as point cloud. In other words, the point cloud represents the possible position and velocity of the satellites as can be seen in FIG. 13. The collision probability calculation is performed in CPU based on the possible position and velocity of the satellites generated through GPU, as shown in FIG. 10.

The orbit propagation kernel may be used to have each thread integrate one possible state of the space object at a time instant. In GPUs, each thread copies a possible state of the space object from global or main memory into shared memory and then performs the orbit propagation. Once the possible (or predicted) state of the space object has been updated in time, it is copied back out to global memory and another possible state of the space object is retrieved and stashed in device GPU memory. It is noted that the number of threads in a block increases the device memory. Thus when launching the orbit propagation kernel, the number of threads per block must be consistent with the available shared memory of the device. The optimal launch configuration for the kernel depends on the capability of the device. Based on device Quadro K2000, the launch configuration of blocks number=50, threads number=1000 works well.

Predicting the collision probability of arbitrary two space objects may be approximated by a ratio between the number of the neighboring samples of two space objects and the total number of the samples of the two space objects. In other words, the collision probability is instantly estimated and the possible minimum distance between arbitrary two space objects of interest is calculated in real-time.

Each RSO $X_j(t_0, \chi_i)=[r^T, \dot{r}^T]^T$ is then propagated to some time $t_k$ to yield $X_j(t_k, \chi_i)$. Note that $\chi_i$, $1 \leq i \leq N_{QMC}$ denotes the samples. $N_{QMC}$ is the number of samples. 'T' denotes the transpose operation. This procedure is conducted for any number of satellites included in the analysis. Given any two satellites (l=1, 2), the distance of them at $t_k$ is given by $d(t_k, \chi_i, \chi'_i) = \|r_1(t_k, \chi_i) - r_2(t_k, \chi'_i)\|_2$ where $\chi_i \neq \chi'_i$ and $\|\Psi\|_2$ denotes the L2 norm. The instantaneous probability of collision can be calculated by $$P_c(\rho) = \frac{\text{count}(d(t_k, \chi_i, \chi'_i) \leq \rho)}{N_{QMC}},$$

where $\rho$ is a predefined value which indicates the collision radius, and the count( ) operator calculates the number of the argument satisfying the constraint over $i=1, \ldots, N_{QMC}$.

The computational complexity of collision probability is relatively small, thus this part can be performed in real-time even in CPU.

It is also noted that each batch of work is supposed to be as uniform as possible on each thread. QMC method with adaptive step size is a very uniform process where each thread in a warp is executing the same instruction on GPUs.

Example: CUDA Output Asynchronous Transmission

As known, the threads with less work are forced into redundant operations while waiting for other threads with heavier loads to complete. This situation is called thread divergence and thus the system might be in a jeopardy of device synchronization which seriously degrades the parallel computing performance.

As a rule of thumb and can be seen in FIG. 10, asynchronous data transmission from device to host is implemented and thus the system bypass the relatively time-consuming thread synchronization. Hyper-Q introduces the Grid Management Unit (GMU), which creates multiple hardware work queues to reduce or eliminate the synchronization time. With GMU, streams can be kept as individual pipelines of work.

Figure 15:
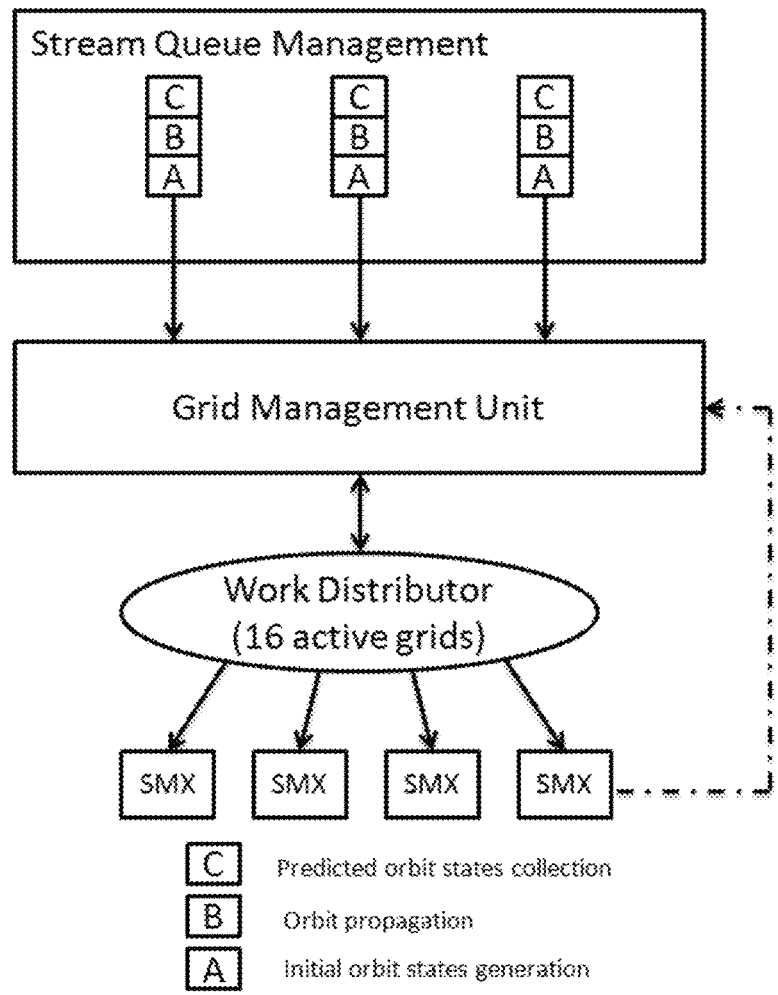
FIG. 15 depicts diagram of an exemplary infrastructure of Hyper-Q in accordance with various embodiments of present disclosure.

FIG. 15 introduces the diagram of the infrastructure of Hyper-Q. GMU is introduced to create multiple hardware work queues to reduce the synchronization time. With the GMU, streams such as orbit propagation and random number generation can be kept as individual pipelines of work.

Figure 16:
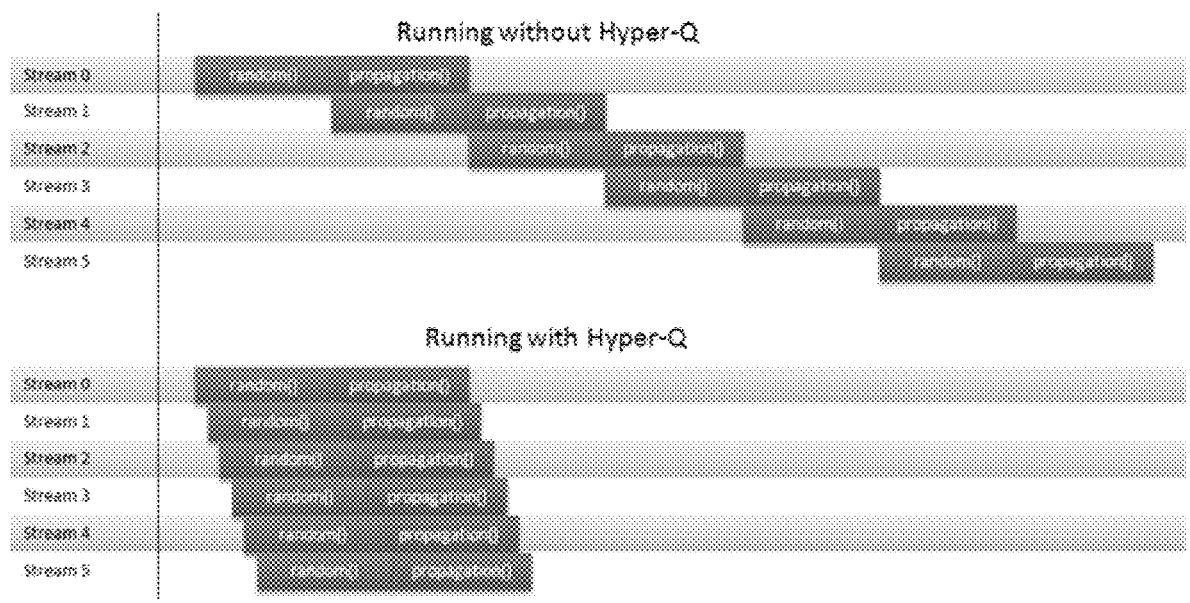
FIG. 16 depicts running time of the devices implemented with and without Hyper-Q.

FIG. 15 also shows the feedback path from the streaming multiprocessors (SMXs) to the Work Distributor and the work creation path from the SMXs to the GMU. In one embodiment, from device to host, the point cloud propagated by GPU is asynchronously transmitted. From host to device, the request for data transmission is sent back to GPU. These components provide dynamic parallelism and CUDA output asynchronous transmission. FIG. 16 shows profile of the running time. As shown, on a device without Hyper-Q, the single work pipeline in hardware means that only concurrency between pairs of orbit propagation kernel propagation from stream n and random number generation kernel random(•) from stream n+1 can be seen. While on a device with Hyper-Q, the synchronization time are eliminated and all kernel random can execute concurrently, as can all the kernel propagation.

CUDA Based Space Objects Visualization

FIG. 13 shows visualization and rendering example of the possible states of two space objects. Each point on the orbit represents a possible or predicted state of the space object. The collision probability calculation requires an N*N grid of all pair-wise operations. Since each pair can be computed independently, there is $O(N^2)$ available parallelism. However, this approach requires $O(N^2)$ memory and would be substantially limited by memory bandwidth. This dilemma was resolved by the introduction of the notion of a computational tile in CUDA. The computational tile is a square region of the grid of pair-wise forces including p rows and p columns. Only 2p body descriptors are required to evaluate all the $p^2$ interactions in the tile (p of which can be reused later). These body descriptions can be stored in device memory or in registers. Theoretically, the total effect of the interactions in the tile on the p bodies is captured as an update top acceleration vectors.

Figure 14:
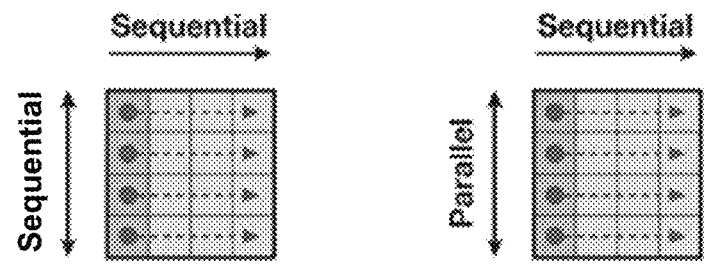
FIG. 14 is a schematic comparing visualization and rendering in CPU on the left hand side with visualization and rendering in GPU on the right hand side in accordance with various embodiments of present disclosure.

To achieve optimal reuse of data, the computation of tile is arranged so that the interactions in each row are evaluated in sequential order, updating the acceleration vector, while the separate rows are evaluated in parallel. As shown in FIG. 14, the schematic on the left hand side shows visualization and rendering in CPU, while the schematic on the right hand side shows visualization and rendering in GPU.

A tile is evaluated by p threads performing the same sequence of operations on different data. Each thread updates the acceleration of one body as a result of its interaction with p other bodies. p body descriptors are loaded from the GPU device memory into the device memory provided to each thread block in the CUDA model. Each thread in the block evaluates p successive interactions. The result of the tile calculation is p updated accelerations. Thus a non-real-time visualization achieves real-time performance based on the application of a parallel computing infrastructure.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A space situational awareness demonstration system, comprising:
    a back-end computational engine includes one or more servers, configured for:
        collecting space initialization data of space objects from initialized space sources and pre-processing the space initialization data;
        distributing the space initialization data pushed from the space data collector component into multiple streaming channels for streaming;
        streaming, mapping, and reducing the space initialization data from the data relocation component to provide streamed data;
        calculating the streamed data to conduct a real-time detecting and tracking analysis of the space objects by implementing algorithms for one or more of space uncertainty propagation, space object tracking, sensor management, and collision avoidance; and
    a front-end visualization device, configured for displaying a visualization of space situational awareness (SSA) based on analyzed results from the real-time analysis component.

2. The system according to claim 1, wherein the one or more servers are further configured for:
    streaming the space initialization data from the data relocation component; and
    mapping and reducing the space initialization data into a parallel computational engine.

3. The system according to claim 2, wherein streaming the space initialization data includes a streaming interval that is pre-defined, wherein the streaming interval is 0.3 second.

4. The system according to claim 2, wherein, once the space initialization data are received, the one or more servers are further configured for assigning tasks to process the space initialization data through different computing nodes in a networking platform.

5. The system according to claim 1, wherein the one or more servers are further configured:
    for continuously collecting the space initialization data, and storing the space initialization data in a file server waiting for processing,
    for an acceleration and analysis of the space initialization data, and
    for demonstrating an effectiveness of the SSA demonstration system.

6. The system according to claim 5, wherein the one or more servers are further configured for converting the space initialization data into text format, the text format including satellite initial location X, Y and Z, a velocity direction and a timestamp.

7. The system according to claim 1, wherein the one or more servers are further configured for parsing the streamed data and calling different kinds of programs according to a task type corresponding to the algorithms.

8. The system according to claim 1, wherein:
    the visualization of the SSA includes a visualization of one or more of the space uncertainty propagation, the space object tracking, the sensor management, and the collision avoidance.

9. The system according to claim 1, wherein:
    the front-end visualization device is further configured for visualizing the analyzed results.

10. The system according to claim 1, further including:
    configuration files based on a client input, wherein the configuration files provide space object name, position, velocity, propagator, simulation time, sensor name, sensor location, sensor type, and task type.

11. A space situational awareness demonstration method, comprising:
    collecting and pre-processing, by a space data collector component, space initialization data of space objects from initialized space sources;
    distributing, by a data relocation component, the space initialization data pushed from the space data collector component into multiple streaming channels for streaming;
    streaming, mapping, and reducing, by a streaming platform, the space initialization data from the data relocation component to provide streamed data;
    calculating, by a real-time analysis component, the streamed data to conduct a real-time detecting and tracking analysis of the space objects by implementing algorithms for one or more of space uncertainty propagation, space object tracking, sensor management, and collision avoidance; and
    displaying, by a space visualization component, a visualization of space situational awareness (SSA) based on analyzed results from the real-time analysis component.

12. The method according to claim 11, wherein the streaming platform includes:
    a streaming module for streaming the space initialization data from the data relocation component; and
    a MapReduce module for mapping, and reducing the space initialization data into parallel computational engine.

13. The method according to claim 12, wherein streaming the space initialization data by the streaming module includes a streaming interval that is pre-defined, wherein the streaming interval is 0.3 second.

14. The method according to claim 12, wherein, once the space initialization data are received from the data relocation component, the MapReduce module assigns tasks to process the space initialization data through different computing nodes in a networking platform.

15. The method according to claim 11, wherein the space data collector component includes:
    a data collection module for continuously collecting the space initialization data, and storing the space initialization data in a file server waiting for processing,
    a pre-processing module for an acceleration and analysis of the space initialization data, and
    a message queuing platform for demonstrating an effectiveness of the SSA demonstration system.

16. The method according to claim 15, wherein the pre-processing module converts the space initialization data into text format, the text format including satellite initial location X, Y and Z, a velocity direction and a timestamp.

17. The method according to claim 11, wherein the real-time analysis component includes computational nodes to parse the streamed data and call different kinds of programs according to a task type corresponding to the algorithms.

18. The method according to claim 11, wherein:
the visualization of the SSA includes a visualization of one or more of the space uncertainty propagation, the space object tracking, the sensor management, and the collision avoidance.

19. The method according to claim 11, wherein:
the space visualization component collects and stores the analyzed results from the real-time analysis component.

20. The method according to claim 11, further including:
providing configuration files based on a client input, wherein the configuration files provide space object name, position, velocity, propagator, simulation time, sensor name, sensor location, sensor type, and task type.

* * * * *